United States Patent
Liu et al.

(10) Patent No.: US 8,949,480 B2
(45) Date of Patent: Feb. 3, 2015

(54) METHOD AND SYSTEM FOR TESTING SAFETY AUTOMATION LOGIC OF A MANUFACTURING CELL

(75) Inventors: Jing Liu, Troy, MI (US); Chengyin Yuan, Rochester Hills, MI (US); Fangming Gu, Rochester Hills, MI (US); Stephan R. Biller, Birmingham, MI (US); Demet C. Wood, Farmington Hills, MI (US); Daniel B. Aufderheide, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1448 days.

(21) Appl. No.: 12/463,579

(22) Filed: May 11, 2009

(65) Prior Publication Data

US 2010/0286797 A1   Nov. 11, 2010

(51) Int. Cl.
*G06F 3/00* (2006.01)
*G05B 9/02* (2006.01)
*G06F 11/26* (2006.01)

(52) U.S. Cl.
CPC ............... *G05B 9/02* (2013.01); *G06F 11/261* (2013.01)
USPC .......................................................... 710/15

(58) Field of Classification Search
CPC ............ H04L 43/0817; H04L 12/2602; G06F 13/385; G06F 11/261; G05B 9/02
See application file for complete search history.

(56) References Cited

U.S. PATENT DOCUMENTS

| | | | |
|---|---|---|---|
| 5,331,579 A * | 7/1994 | Maguire et al. | 703/2 |
| 7,231,436 B1 * | 6/2007 | Dalfo et al. | 709/223 |
| 2003/0208283 A1 * | 11/2003 | Vasko et al. | 700/21 |
| 2004/0250191 A1 * | 12/2004 | Leaming | 714/742 |
| 2005/0289416 A1 * | 12/2005 | Burke et al. | 714/724 |
| 2007/0220341 A1 * | 9/2007 | Apostoloiu et al. | 714/33 |
| 2007/0288674 A1 * | 12/2007 | Ikeno | 710/110 |
| 2008/0021597 A1 * | 1/2008 | Merte et al. | 700/255 |
| 2009/0070062 A1 * | 3/2009 | Kirrmann et al. | 702/122 |
| 2009/0292514 A1 * | 11/2009 | McKim et al. | 703/6 |
| 2010/0023534 A1 * | 1/2010 | Liu et al. | 707/100 |
| 2010/0146420 A1 * | 6/2010 | Bharadwaj et al. | 715/764 |

* cited by examiner

*Primary Examiner* — Henry Tsai
*Assistant Examiner* — Aurangzeb Hassan
(74) *Attorney, Agent, or Firm* — Quinn Law Group, PLLC (57) ABSTRACT

A method for testing the safety automation logic used in a manufacturing cell includes recording control signals of a safety-related component such as an E-Stop, light curtain, gate lock, or a safety mat using a host machine, and then disconnecting the component from the host machine. The recorded test signals are transmitted to an automation controller in accordance with a test scenario from a test scenario generator module (TSGM) to emulate operation of the component. The automation logic may be certified using the playback of the recorded test signals. A system for testing the safety automation logic includes the controller, host machine, and TSGM. The host machine records the control signals and plays back the test signals on the controller to emulate operation of the component. The automation control logic may be certified using the test signals, e.g., by comparing these to the test specification or standard.

18 Claims, 5 Drawing Sheets

METHOD AND SYSTEM FOR TESTING SAFETY AUTOMATION LOGIC OF A MANUFACTURING CELL

TECHNICAL FIELD

The invention relates generally to the testing of automation logic, and in particular to a computer-executable method and system for testing the safety-related automation logic that is used in a manufacturing cell.

BACKGROUND OF THE INVENTION

Various processes and robotic equipment may be used to facilitate product manufacturing and assembly, such as but not limited to products such as vehicles or onboard systems. Automated manufacturing cells may be laid out on a plant floor to streamline production. To ensure plant floor safety, the perimeter of a given cell is typically closely monitored and access thereto is guarded using fences and various safety sensors and components, e.g., push-button or E-Stop devices, light curtains, safety mats, laser scanners, guard locks, safety rope, etc. Attempted access into the working area of the cell can be instantly detected using such sensors, resulting in an almost instantaneous shut down or suspension of operation of automated running equipment in the cell if access is attempted.

Automatic control of a manufacturing cell generally encompasses two primary control tasks: normal automation control and safety automation control. Normal automation control refers to the control of any work-related tasks in the cell using any available means, such as closed loop control and/or open loop controls. Precise control is maintained over the various automated equipment operating within the cell, including robots, conveyors, fixtures, etc. The second primary control task, safety automation control, refers to monitoring of the cell for any safety-related tasks and concerns, e.g., the presence of operators in or near the robot working area, as well as for certain hardware failures occurring in the cell. Typically, control of the tasks is integrated into a single safety programmable logic controller that is often referred to as a Safety PLC. Therefore, the same term will be employed extensively herein for consistency.

Cell sensors and safety-related components may be vendor-specific both in operation and in internal construction, but nevertheless must function properly in response to the overall or top-level control logic of the cell. Various governmental and/or regulatory requirements and industrial standards, e.g., IEC 61508 and similar standards, may require a $3^{rd}$ party certification of the safety-related portions of the automation control logic that is used in such cells. Conventional logic certification and testing methods utilize purely hardware-based testing, and may result in a longer setup time and relatively high testing costs. Additionally, such methods may not provide a viable method for completely testing the various safety-related tasks and concerns of a cell. For example, some operator-triggered events, such as the interruption of a perimeter light curtain with a nearly simultaneous activation of an E-Stop device located a substantial distance away from the light curtain, may be difficult to achieve in a reliable and highly repeatable manner. Also, safety-related components and sensors may be provided in black-box form from a supplier, thereby making the complete testing of components and their overall system a challenging task.

SUMMARY OF THE INVENTION

Accordingly, a test bed-driven method is provided for testing the safety automation logic used in the operational control of a manufacturing cell. Testing results may then be used to certify the safety automation logic of a safety-related component used in the cell, and/or the safety automation logic of the entire manufacturing cell. The method and an associated system for executing the method are hybrid in nature, with the term "hybrid" as used herein referring to the integration of both hardware and software-based solutions in testing the operation of a complete manufacturing cell, with all of its required safety-related components and sensors.

The system includes a host machine in communication with a safety-related component such as an E-Stop, light curtain, gate lock, safety mat, etc., various sensors, actuators, other physical or simulated work or safety-related components, and a testing scenario generator module (TSGM). The automation controller may communicate with the various components over a network connection. The TSGM may be used to trigger particular signal sequences of the components, with a certification report ultimately generated, displayed, and/or printed as a deliverable product according to one embodiment.

A host machine, e.g., a personal computer or a laptop, and/or a separate or integrated data logging device, may be used to record the safety-related component's behavior to a particular set of input control signals, with the recorded feedback signals transmitted to or played back on the automation controller after disconnecting the safety-related component from the host machine, or from an input/output (I/O) device of the host machine in one embodiment. Playback may be mixed in with the selective activation of other physical and/or simulated work or safety-related components to fully test the overall safety automation logic of a cell. The TSGM may determine the nature of test signals to be generated based on the recorded behavior and any required test scenarios, and generate these signals as needed.

In particular, a method for testing the automation logic of a manufacturing cell includes recording the behavior of a safety-related component as a set of control signals in a memory location that is accessible by a host machine. When testing the safety automation logic, a virtual safety component may be used in the test setup, with the recorded signals being played back on an automation controller using the host machine. The test signals are transmitted to an I/O block and played back on the automation controller based on predetermined test scenarios, thereby electronically emulating the operation of the disconnected safety-related component. The automation logic of the cell and/or the component may be certified thereafter using the test signals, which may be mixed with the performance of additional real or simulated components as needed.

A system for testing the safety automation logic of a manufacturing cell includes a host machine in communication with the automation controller, a safety-related component, and at least one additional component set up in a test bed environment. The system includes a testing scenario generator module (TSGM), and in one embodiment may also include a safety logic certifier module (SLCM) for certifying the safety automation logic after testing. The TSGM is in communication with the host machine and is adapted for generating input control signals based on predetermined test scenarios. The host machine records the performance or control feedback of the component in a memory location that is accessible by the host machine. The recorded control signals may be transmitted to an I/O block and played back on the automation controller as corresponding test signals as needed to emulate operation of the component. The performance of the safety automation logic may be certified using the test signals, with a report generated, displayed, and/or printed as needed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the drawings, wherein like reference numbers correspond to like or similar components throughout the several figures, and beginning with FIG. 1, a manufacturing cell 10 may include various normal task-related components and safety-task related components for manufacturing and/or assembly of a product, as well as for ensuring that the cell 10 and its perimeter fence 12 are sufficiently monitored for the presence of operators 11 as described below.

Normal task-related components of the cell 10 may include, but are not necessarily limited to, robots 16 adapted for performing one or more work-related tasks. To perform such work-related tasks, each robot 16 may automatically move within a predetermined operating zone 18, with each operating zone 18 representing the effective range of motion of the robots 16. Safety task-related components of the cell 10 may include, by way of example, a light emitter/receiver 20A configured for generating and receiving a light beam and/or a light curtain 22, a gate lock 20B which monitors an entrance gate that may be opened by an operator 11 in order to cross the perimeter fence 12 and enter the cell 10, and/or one or more push-button or E-Stop devices 20C.

Optional safety mats 20D such as pressure-sensing mats or other sensory mats, and/or other monitoring devices not mentioned above, may also be placed as needed within the cell 10 to detect an attempted entry or presence of an operator 11 in or near the cell 10. Each component 20A-20D may be equipped with a suitably configured sensor or sensors (not shown) in electronic communication with one or more automation controllers (C) 34, each of which may be housed within a protective outer cabinet 24A as shown in FIG. 1.

Automation of the cell 10 may be controlled using the controller 34 via control logic, i.e., plant-floor or production ready code that may be executed using the hardware of the controller 34. As will be understood by those of ordinary skill in the art, an automation controller 34 may be configured as a computer-based process control device having a microprocessor or central processing unit (CPU), various electronic and/or magnetic memory locations or areas, a power supply, one or more network connectors, and input/output or I/O sections for receiving and transmitting the various I/O control signals being fed to the controller 34 by a process being controlled. One or more human-machine interface (HMI) 17 may provide direct control access to the cell 10.

A control processor 24 (see FIG. 2) may be included with the controller 34, and may include appropriate control circuitry for executing predetermined control sequences in response to one or more input control variables in order to produce a desired output response. In this manner, the status of various control inputs may be checked, usually by reading values determined by sensors positioned with the process being controlled, executes a function, updates the output status, and then repeats the cycle, as is well understood in the art.

Figure 2:
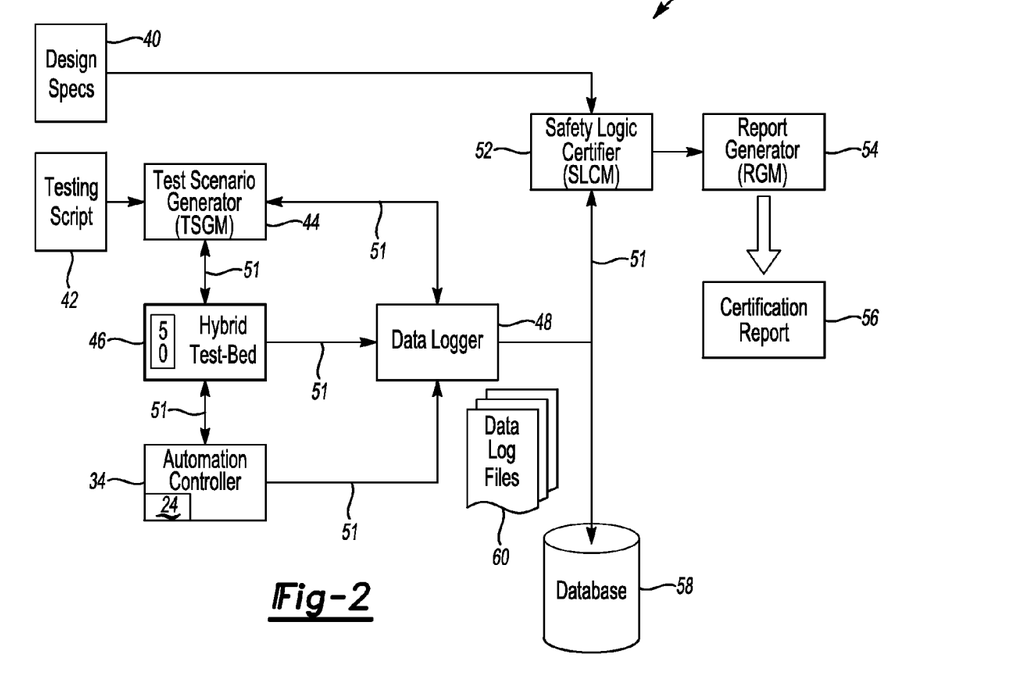
FIG. 2 is a flow diagram of a system for testing such safety automation logic.

Referring to FIG. 2, a system 30 is provided for testing the safety automation logic of the cell 10 for later certification according to $3^{rd}$ party specifications or requirements as described above. Design specifications 40 determining the top-level certification requirements, such as a predetermined scenario to be tested to, may be fed into a safety logic certifier module (SLCM) 52, which in turn may be placed in wireless or direct network communication over a network 51 with an automation controller 34 and one or more databases 58. The automation controller 34 may include control processor 24 and/or any necessary hardware and/or software elements thereof, as will be understood by those of ordinary skill in the art.

The SLCM 52 may communicate with or be configured to include a report generator module (RGM) 54. The RGM 54 may be configured as a personal computer, a laptop, or any other suitable electronic device, which may be integrated with or separate from the SLCM 52. The SLCM 52 may be configured to compare the design specification 40 to test results, and the RGM 54 maybe adapted to print and/or display a certification report 56 based on the results of such a comparison. That is, the RGM 54 is capable of processing a collective set of recorded waveform or signal information pertaining to the operation of the robots 16 and the components 20A-D used in the cell 10, or in a test bed that is set up as a model of the cell 10, and to ultimately print and/or display the certification report 56 as part of an overall safety automation logic certification process.

A testing script 42 may describe the required test scenarios and component sequence(s), and may be fed into a test scenario generator module (TSGM) 44 that is in communication with a hybrid hardware/software laboratory setup or test bed 46. The test bed 46 generally describes the physical hardware and logic control elements of the cell 10 of FIG. 1 that are to be physically modeled, tested, and ultimately certified. In one embodiment, in a test scenario in which a component 20C is to be tested in conjunction with gate lock 20B in a cell 10 having one or more robots 16 (see FIG. 1), these components may be set up in a laboratory or another controlled environment along with the required hardware and associated sensors.

The controller 34 may be connected to the test bed 46 over the network 51 and/or another suitable communications link. A host machine 50 and/or a data logger 48 may be used to record various control signals as noted above, and to play back the recorded signals on the automation controller 34 during emulation of the operation of the components 20A-D. That is, the host machine 50 may be placed in communication with the automation controller 34 after recording the signals to allow automated playback of the recorded signals on the automation controller 34 as part of a set of test signals, thereby electronically emulating the performance of the safety-related components within the cell 10.

Figure 1:
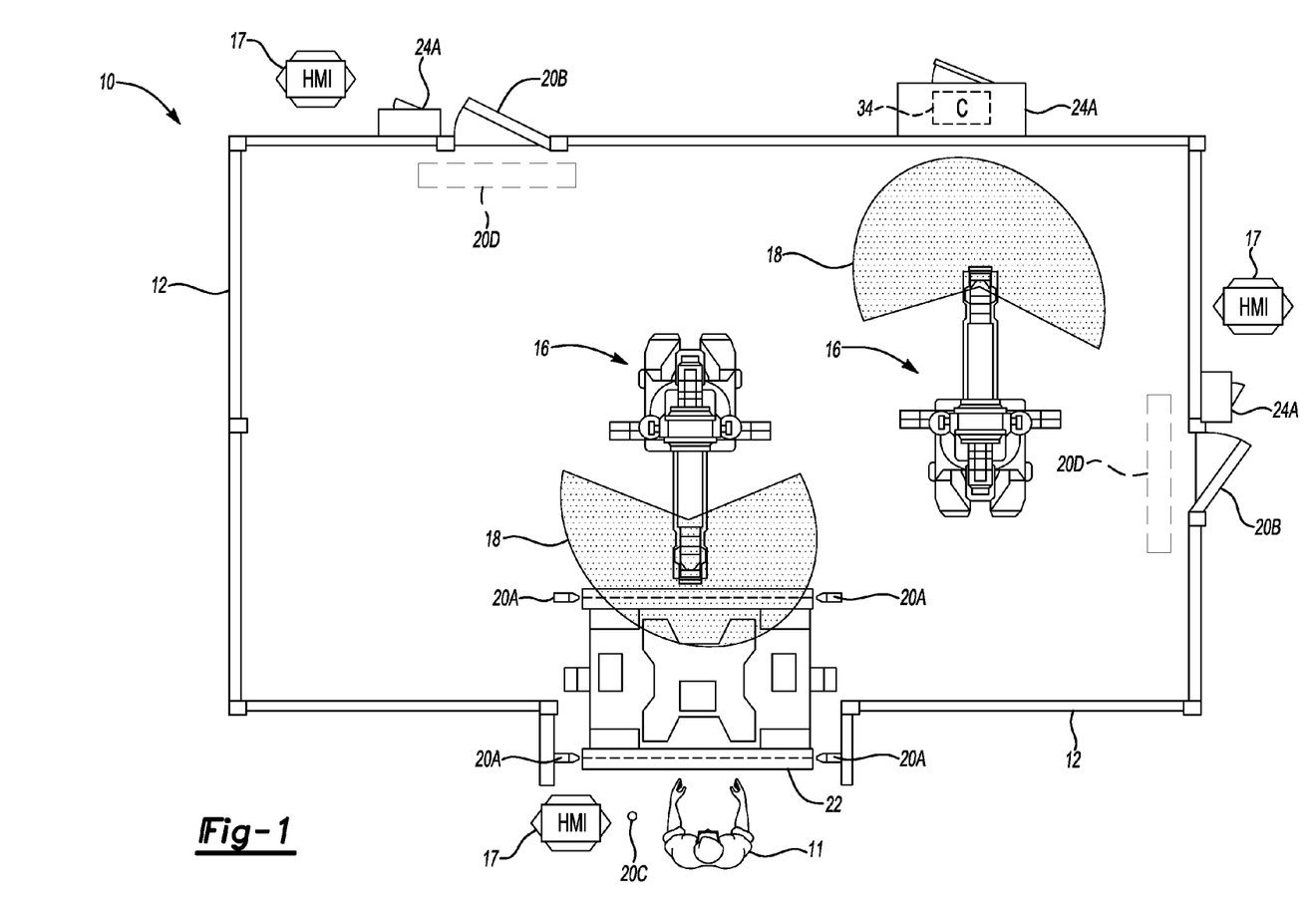
FIG. 1 is a schematic illustration of a manufacturing cell having safety automation logic that may be tested using the method of the invention.
Figure 3:
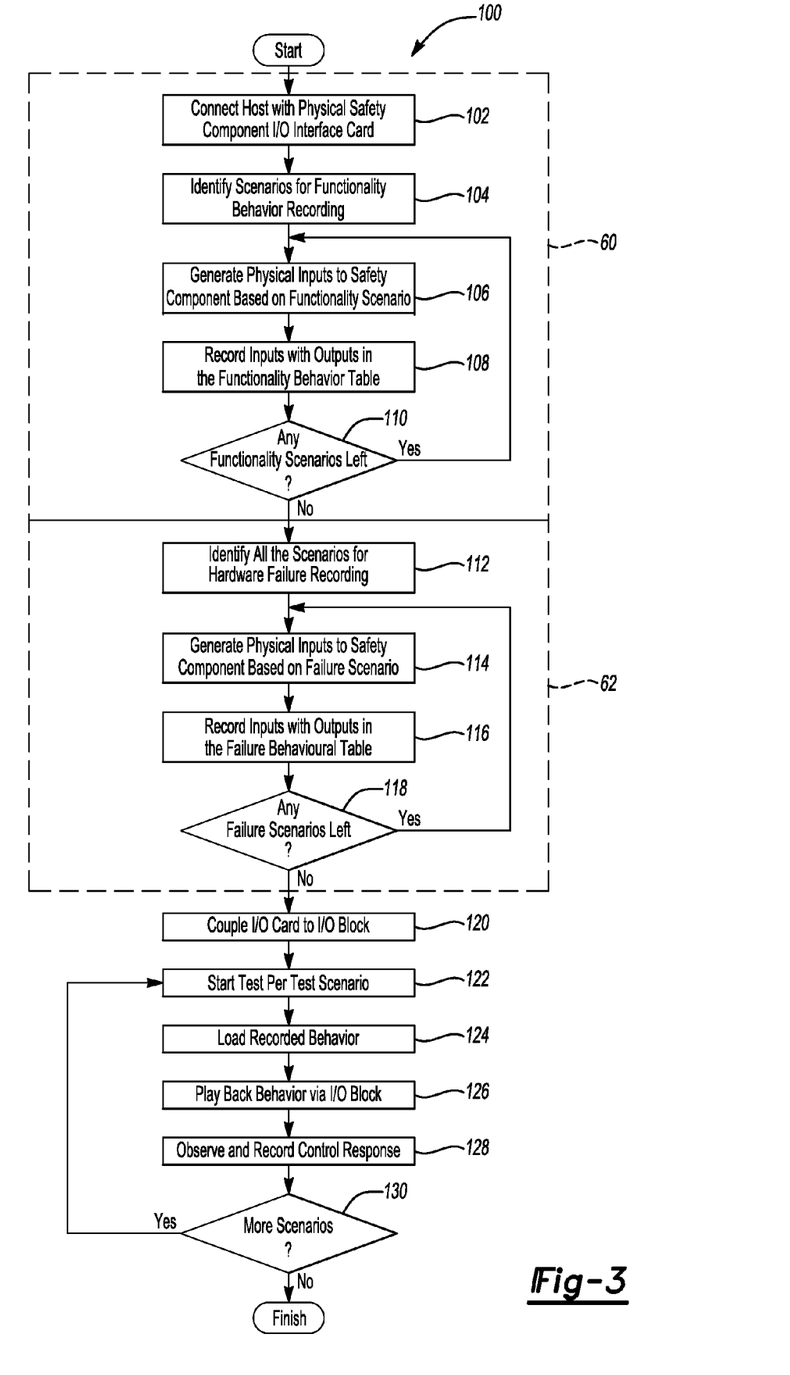
FIG. 3 is a flow chart describing a method for testing the safety automation logic used in a manufacturing cell such as that shown in FIG. 1.

Referring to FIG. 3 in conjunction with the structure shown in FIGS. 1 and 2, a method 100 is provided for capturing signals needed for emulating a safety-related component, and for testing the safety automation logic of a manufacturing cell as set forth above, e.g., the cell 10 of FIG. 1 or a similar cell. While FIG. 3 may be used to test the control logic of a safety-related component of the cell 10, a similar process may be used. The method 100 may be functionally divided into two safety component test areas as noted above, i.e., a normal functional testing area 60 and a failure mode behavior testing area 62.

Figure 3A:
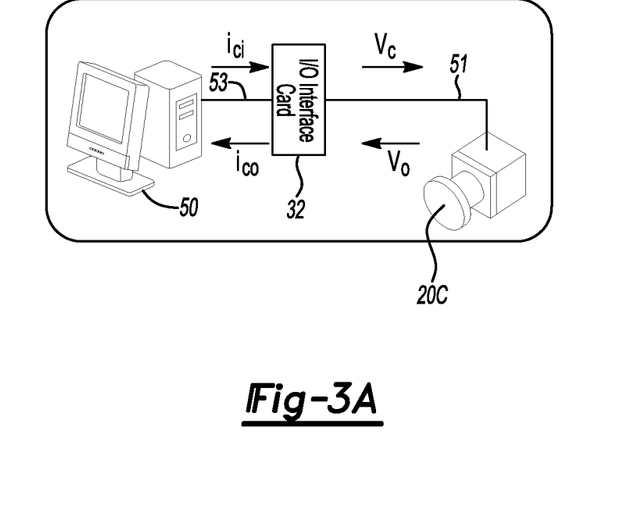
FIG. 3A is a schematic flow diagram of a portion of the system of FIG. 2 used in recording control signals and feedback from a safety-related component.

Beginning at step 102, and referring briefly to FIG. 3A, the host machine 50 may be electrically connected to the safety component via the I/O card 32 using a connection 53, which may be a network connection different from the network 51 or a direct connection depending on the particular design. In one embodiment the physical component that is connected to the I/O card 32 may be an E-Stop 20C, which is shown in FIG. 3A for illustrative purposes, although any of the components 20A-D of FIG. 1 or other safety-related components not mentioned here may also be used within the scope of the invention.

Once connected, the method 100 proceeds to step 104, where test scenarios are identified for later recording of particular functionality behavior. For example, the component 20C of FIG. 3 may be used within a software-programmable environment, with a test scenario generated by the TSGM 44 of FIG. 2 as noted above. The component 20C may have a pair of input channels and a pair of output channels. A sensor may monitor the states of the output channels and turn on an input when certain testing conditions are considered, e.g., a manual or an automatic reset.

Other components 20A-D may likewise have similar or differently configured input and output channels. The test scenarios of step 104 may be based at least partially on $3^{rd}$ party requirements, i.e., per a particular government or regulatory agency standard as noted above, and may call out the required control steps resulting from activation or one or more of the components 20A-D, or can be user-defined testing scenarios intended to meet particular design needs. Such activation may include a particular control sequence, e.g., activation of a component 20C within milliseconds of an opening of a gate lock 20B and/or another sensor-equipped monitoring device, etc. Whatever the testing scenario, once the scenario(s) are identified at step 104 the method 100 proceeds to step 106.

At step 106, input control signals or control inputs to the components 20A-D are generated by the host machine 50 based on the test scenarios from the TSGM 44 (see step 104), and then transmitted via the I/O interface card 32 to the particular component being tested. Referring again briefly to FIG. 3A, input control signals or inputs (arrow $i_{ci}$) are transmitted to the I/O card 32 over the connection 53, and an appropriate voltage control signal (arrow $V_c$) is then transmitted from the I/O card 32 to the component 20C over the network 51. A voltage output signal ($V_o$) may be transmitted in turn from the component 20C back to the I/O card 32. Physical inputs may include, but are not necessarily limited to, the physical interruption or breaking of a light curtain 22, opening a gate lock 20B, pressing or activating an E-Stop 20C, stepping on a safety mat 20D, etc., including doing so in a particular sequence, or can be a correct input voltage to the component, depending on the particular test scenario.

Figure 4:
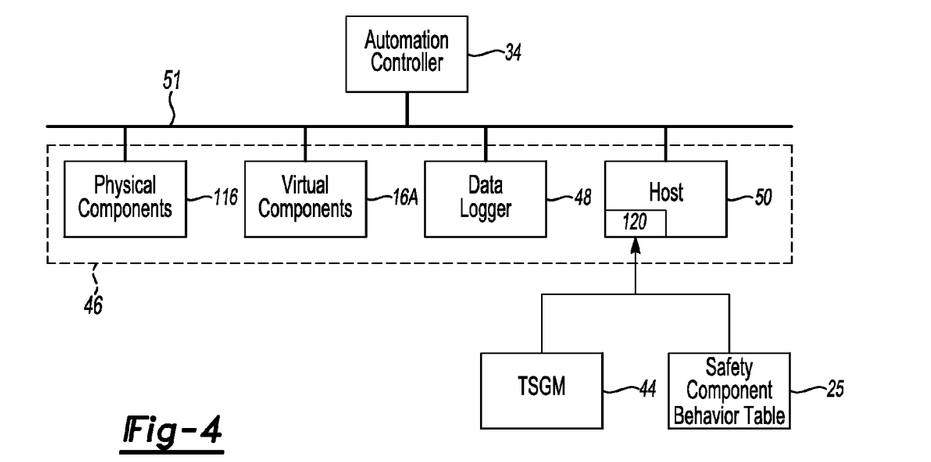
FIG. 4 is a network diagram for a hybrid test bed and associated components usable for executing the method of FIG. 3.

At step 108, the control feedback or output control signals from the component being tested are recorded to capture the behavior of the component being tested. Referring again briefly to FIG. 3A, the feedback or output control signals are represented by arrow $i_{co}$. The feedback may be related or transmitted from the I/O card 32 to the host machine 50 and recorded using any available means, such as using the host machine 50 and/or the data logger 48, which may be integrated or separate devices. These values may be recorded in table form, e.g., a behavior table 25 as shown in FIG. 4 and described below, or in another suitable form. Once recorded, the method 100 proceeds to step 110.

At step 110, the method 100 determines whether all functionality scenarios identified at step 104 have been tested and recorded. If not, the method 100 repeats steps 104-110 in a loop until all of the functionality scenarios have been completed, and then proceeds to step 112. Normal functional behavior testing of area 60 is complete.

At step 112, failure mode behavior testing (area 62) begins. In a counterpart step to step 104 explained above, required scenarios for hardware-based failure or abnormal condition testing and recording are identified as failure scenarios. For example, an electrical shortage or other failure may be a requirement for certification of control logic for the controller 34. Once identified, steps 114 and 116 respectively generate the inputs and record the inputs and outputs based on the required hardware-based failure scenarios. The method 100 then proceeds to step 118.

At step 118, as with step 110 above, the method 100 determines whether all failure scenarios identified at step 112 have been recorded. If not, the method 100 repeats steps 112-118 in a loop until all of the hardware-based failure scenarios have been completed, and then proceeds to step 120. Step 118 completes the failure mode behavior testing, with playback of recorded behavior commencing with step 120.

Figure 3B:
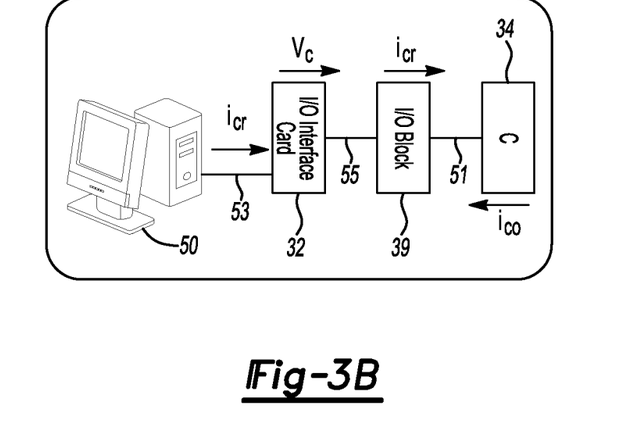
FIG. 3B is a schematic flow diagram of a portion of the system of FIG. 2 during playback of recorded control signals and feedback via an automation controller during safety automation logic testing.

At step 120, the I/O card 32 of FIG. 3B is coupled to an I/O block 39 via a direct or a hardwired connection 53. The host machine 50 is thus connected to the controller 34 via each of the I/O card 32 and the I/O block 39. Once connected, the method 100 proceeds to step 122.

At step 122, testing is initiated per a predetermined test scenario from the TSGM 44 of FIG. 2. That is, the test scenario is loaded into the host machine 50 or into a location accessible thereby. The method 100 proceeds to step 124, wherein the signals describing the previously recorded behavior, i.e., the recorded signals (arrow $i_{cr}$), is loaded. The particular recorded signals loaded at step 122 correspond to the signals called out by the test scenario loaded at step 122 described above. Once loaded, the method 100 proceeds to step 126.

At step 126, the test is executed by playing back the recorded test signals, i.e., the recorded output/feedback and input control signals (arrow $i_{cr}$), on the controller 34. As shown in FIG. 3B, the input control signals (arrow $i_{cr}$) are automatically transmitted to the I/O card 32, and a voltage signal (arrow Vc) is communicated to the I/O block 39 from the I/O card 32 in response to the signals (arrows $i_{cr}$). The input control signals (arrow $i_{cr}$) are played back on the controller 34 from the I/O block 39, and then feedback or output signals (arrow $i_{co}$) from the controller 34 are communicated back to the I/O block 39 and I/O card 32 for use by the host machine 50 or other devices as needed.

At step 128, the host machine 50 may be used to observe and record the control response occurring at step 126. Once recorded, the method concludes with step 130, wherein it is determined whether more scenarios remain. If so, the algorithm repeats steps 122-130 until all functionality and failure scenarios are complete. The test results may then be used by a 3$^{rd}$ party or by the user to certify the safety automation logic of cell 10 (see FIG. 1) if so desired.

In this manner, the performance of the component 20C of FIG. 3A, or any other component being tested, may be emulated without the physical component being present. Those of ordinary skill in the art will recognize that the simplified examples of FIGS. 3A and 3B are not limiting, and that simulated safety components may also interact with one or more real components and one or more simulated components during a given test. That is, execution of method 100 may include the selective mixing of various other real or simulated devices. The test may include either or both of the functionality and hardware failure testing, i.e., areas 60 and 62 of FIG. 3, of one or more safety-related components as a test of the overall safety automation logic of the cell 10 of FIG. 1, or a similar cell, which may be certified thereafter as needed.

For example, referring to FIG. 4 "physical components" within the test bed 46 may include physical components 116, such as but not limited to robots 16 and/or other normal components or safety-related components 20A-D, simulated or virtual components 16A, and/or other emulated safety-related components 120 to be tested. Virtual components 16A may include any automated or work task component corresponding to a simulation model, i.e., a simulated robot, simulated conveyor, etc. In a real cell, such as the cell 10 of FIG. 1, if one were to remove a robot 16 and connect a simulated robot instead using the same network and communication protocol, the controller 34 would be unable to differentiate since the signal it receives from a simulated robot is seen as being the real or "true" signal.

The recorded test signals (arrow $i_{cr}$) from steps 108 and 116 of FIG. 3 initially describe the behavior of the components 120, e.g., the component 20C of FIG. 3C. These signals may be reorganized in different sequences and communicated to the controller 34 via the host machine 50, or via the TSGM 44 which may be resident therein. That is, the components 20A-D are no longer used with the test bed 46 once their control input signals and feedback or output signals have been recorded, but instead are electronically generated and, if necessary, varied to precisely match approximate the required certification scenarios.

The host machine 50 may play back the various recorded signals to the automation controller 34, with the various performance data captured in a behavior table 25. Table 25 may be combined with the TSGM 44 to generate certification signals. That is, the test bed 46 may include all of the required physical components such as the physical components 116, the virtual components 16A, the emulated safety components 120 of the host machine 50. The host machine 50 may play back the various recorded control signals (arrow $i_{cr}$) to the controller 34 through the I/O card 32 and I/O block 39 of FIG. 3B as noted above, with the various performance data captured in a behavior table 25 that may then be used to generate the certification report 56.

Figure 4A:
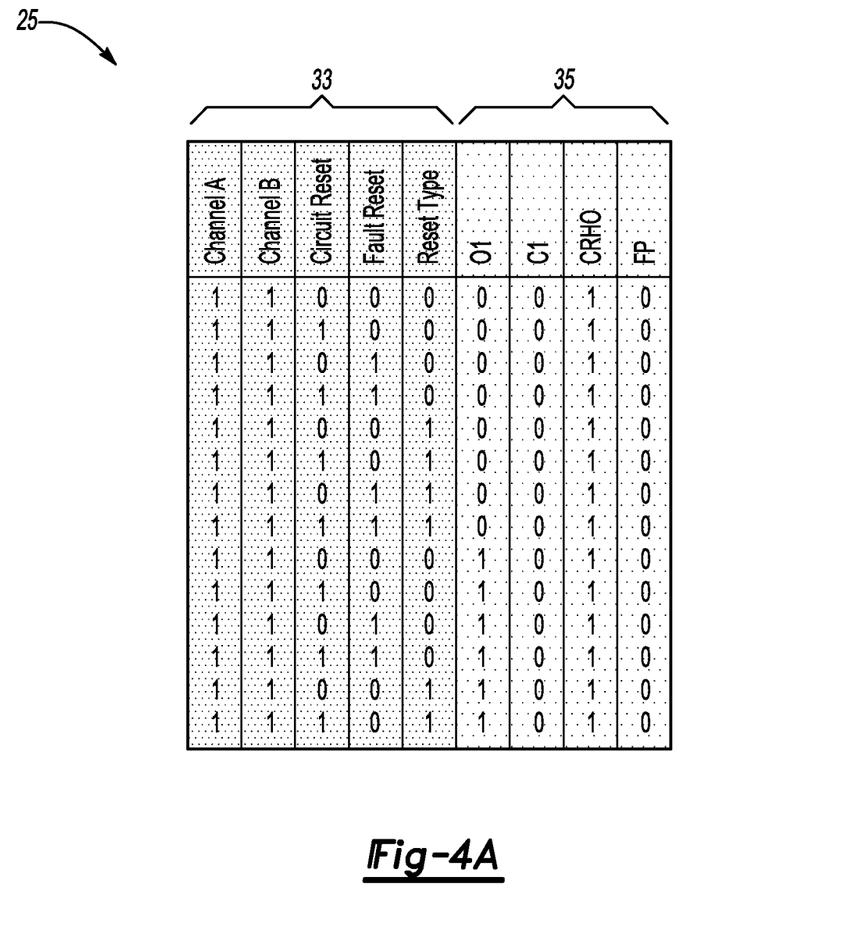
FIG. 4A is a component behavior table according to one embodiment.

Referring to FIG. 4A, a behavior table 25 according to one embodiment may include an input variable set 33 and an output variable set 35 for a device such as the E-Stop 20C described above. The input variable set 33 may include a pair of input channels (channels A and B), a circuit reset state, a fault reset state, and a reset type for recording a binary value indicating which of the reset types are presently set. The output variable set 35 may include an output channel (O1), a cycle inputs value (C1), a circuit reset held on value (CRHO), and a fault present value (FP). Each of the sets 33 and 35 may be Boolean, with the output channel O1 set to "1" or an active state when certain input conditions are met.

The cycle inputs value (C1) may be used to cycle channels A and B through their safe states simultaneously before the circuit can be reset and cleared when channels A and B transition to their "safe" state. The circuit reset held on value (CRHO) may be set when both input channels transition to active states and the circuit reset state is already active, clearing when the circuit reset input is turned off. The fault present value (FP) may be set whenever a fault is present in the instruction, with output channel (O1) prevented from entering an active state when the fault present value is set. Fault present can be cleared when all faults are cleared and the Fault Reset input transitions from off to on.

While the best mode for carrying out the invention has been described in detail, those familiar with the art to which this invention relates will recognize various alternative designs and embodiments for practicing the invention within the scope of the appended claims.

The invention claimed is:

1. A method for testing the performance of automation logic used in a manufacturing cell, the method comprising:
   connecting a first automation component to a host machine through an input/output (I/O) card;
   transmitting a predetermined test scenario from a test scenario generator module (TSGM) to the host machine;
   generating a set of input control signals using the host machine in response to the test scenario, wherein the input control signals are adapted to control a function of the component based on the test scenario;
   transmitting the generated set of input control signals to the first automation component via the I/O card;
   recording the behavior of the first automation component as input control signals and a corresponding set of output control signals in a memory location, as a set of recorded test signals;
   disconnecting the first automation component from the I/O card;
   connecting the I/O card to an automation controller through an I/O block;
   automatically transmitting the test scenario and the recorded test signals to the automation controller through the I/O card and the I/O block for playback on the automation controller, thereby emulating an operation of the first automation component; and
   testing the performance of the automation logic using the recorded test signals.

2. The method of claim 1, further comprising:
   connecting a second automation component to the automation controller;
   wherein testing the performance of the automation logic using the recorded test signals from the first automation component further comprises simultaneously testing the performance of the second automation component.

3. The method of claim 2, wherein the second automation component is one of a physical component and a virtual component.

4. The method of claim 1, including a safety logic certifier module (SLCM), the method further comprising: comparing the test signals to a set of expected values, and then certifying the performance of the safety-related automation logic based on the results of the comparison.

5. The method of claim 1, wherein the test scenario includes at least one of a functionality scenario and a hardware failure scenario.

6. The method of claim 1, wherein recording the input control signals and the output control signals includes recording the input control signals and the output control signals in a memory location that is resident in at least one of: the host machine and a data logger.

7. The method of claim 1, further comprising: automatically mixing the predetermined test scenario with the recorded test signals to create different test scenarios.

8. The method of claim 1, including a report generator module (RGM) in communication with the host machine, the method further comprising one of printing a certification report and displaying the certification report on a display screen using the RGM.

9. A method for testing the performance of safety-related automation logic used in a manufacturing cell, the method comprising:
  connecting a safety-related component to a host machine through an input/output (I/O) card;
  transmitting a set of input control signals to the connected safety-related component via the I/O card;
  recording the set of input control signals into, and a corresponding set of feedback or output control signals out of, the connected safety-related component using the host machine, wherein the recorded signals collectively define a set of recorded test signals;
  disconnecting the safety-related component from the I/O card;
  connecting an automation controller to the host machine through the I/O device and an I/O block;
  generating a predetermined test scenario using a test scenario generator module (TSGM); and
  transmitting the recorded test signals from the host machine to the automation controller in response to the predetermined test scenario to thereby test the performance of safety-related automation logic using the recorded test signals.

10. The method of claim 9, further comprising:
  connecting at least one additional component to the automation controller; and
  testing the performance of the automation logic using the recorded test signals while simultaneously testing the performance of the at least one additional component;
  wherein the additional component is one of a physical component and a virtual component.

11. The method of claim 9, further comprising transmitting a record of the tested performance to a safety logic certifier module (SLCM), and certifying the performance using the SLCM.

12. The method of claim 9, including a report generator module (RGM) operable for displaying a certification report on a display screen and printing the certification report, wherein certifying the performance includes one of displaying and printing the certification report using the RGM.

13. The method of claim 9, wherein connecting a safety-related component includes connecting at least one of an E-Stop, a light beam, a light curtain, a gate lock, and a safety mat.

14. The method of claim 9, wherein the predetermined test scenario includes a required activation sequence of the recorded test signals.

15. A system for testing safety automation logic used in a manufacturing cell, the system comprising:
  an automation controller for controlling the execution of the safety automation logic;
  a host machine connected to the automation controller via an input/output (I/O) card and an I/O block; and
  a testing scenario generator module (TSGM) in communication with the host machine, and adapted for generating a predetermined test scenario;
  wherein the host machine is operable for generating a set of input control signals and transmitting the generated set of input control signals to a safety-related component via the I/O card, recording the set of input control signals and a corresponding output control signals from the connected safety-related component as a set of recorded test signals, and for automatically transmitting the recorded test signals and the predetermined test scenario to the automation controller to thereby test the safety automation logic when the safety-related component is disconnected from the I/O card.

16. The system of claim 15, further comprising a safety logic certifier module (SLCM) in communication with the host machine and adapted for certifying the performance of the safety automation logic.

17. The system of claim 15, further comprising at least one additional component connected to the automation controller, wherein the additional component is one of a physical component and a virtual component.

18. The system of claim 15, wherein the safety-related component is one of: an E-Stop device, a light beam, a light curtain, a gate lock, and a safety mat.

* * * * *